United States Patent [19]
Steffens, Jr. et al.

[11] Patent Number: 5,439,249
[45] Date of Patent: Aug. 8, 1995

[54] VEHICLE OCCUPANT RESTRAINT SYSTEM INCLUDING OCCUPANT POSITION SENSOR MOUNTED IN SEAT BACK

[75] Inventors: Charles E. Steffens, Jr., Washington; Thomas H. Vos, Rochester; Scott B. Gentry, Romeo; Joseph F. Mazur, Washington; Brian K. Blackburn, Rochester, all of Mich.

[73] Assignee: TRW Vehicle Safety Systems Inc., Lyndhurst, Ohio

[21] Appl. No.: 349,385

[22] Filed: Dec. 5, 1994

Related U.S. Application Data

[63] Continuation of Ser. No. 161,141, Dec. 2, 1993, abandoned.

[51] Int. Cl.⁶ .................. B60R 21/26; B60R 21/28
[52] U.S. Cl. .................. 280/735; 280/736; 280/739
[58] Field of Search ........... 280/735, 734, 736, 739, 280/742, 728 R, 730 R, 731, 732; 180/282, 274, 273, 272, 271

[56] References Cited

U.S. PATENT DOCUMENTS

| | | | |
|---|---|---|---|
| 3,177,481 | 4/1965 | Joy et al. | 180/273 |
| 4,796,013 | 1/1989 | Yasuda et al. | 180/272 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |
| 5,184,845 | 2/1993 | Omura | 280/735 |
| 5,232,243 | 8/1993 | Blackburn et al. | 280/735 |
| 5,330,226 | 7/1994 | Gentry et al. | 280/735 |

FOREIGN PATENT DOCUMENTS

| | | | |
|---|---|---|---|
| 3802159 | 8/1989 | Germany | 280/735 |
| 3809074 | 10/1989 | Germany | 280/728 R |
| 4023109 | 1/1992 | Germany | 280/734 |

Primary Examiner—Margaret A. Focarino
Assistant Examiner—Peter C. English
Attorney, Agent, or Firm—Tarolli, Sundheim & Covell

[57] ABSTRACT

A vehicle occupant restraint system (10) comprises a vehicle seat (12) including a seat bottom (14), a seat back (16), and an occupant position sensor (20) mounted in the seat back. The occupant position sensor is located about sixteen inches above a flat plane (99) of the seat bottom of the vehicle seat and below a head rest (11) of the vehicle seat. The seat back of the vehicle seat includes foam material (40) to which the occupant position sensor is secured. The seat back of the vehicle seat also includes fabric material (41) which covers the occupant position sensor secured to the foam material. The fabric material and the foam material of the seat back cooperate to protect the occupant position sensor and hide the occupant position sensor from view. The occupant position sensor senses the position of an occupant in the vehicle seat and provides a position signal (21) functionally related to the position of the occupant in the vehicle seat. An occupant restraint (17) actuates in response to a deceleration signal (31) indicative of sudden vehicle deceleration above a predetermined threshold such as occurs in a vehicle collision. When actuated, the occupant restraint restrains the occupant in the vehicle seat. The operation of the occupant restraint is controlled as a function of the position signal from the occupant position sensor.

19 Claims, 2 Drawing Sheets

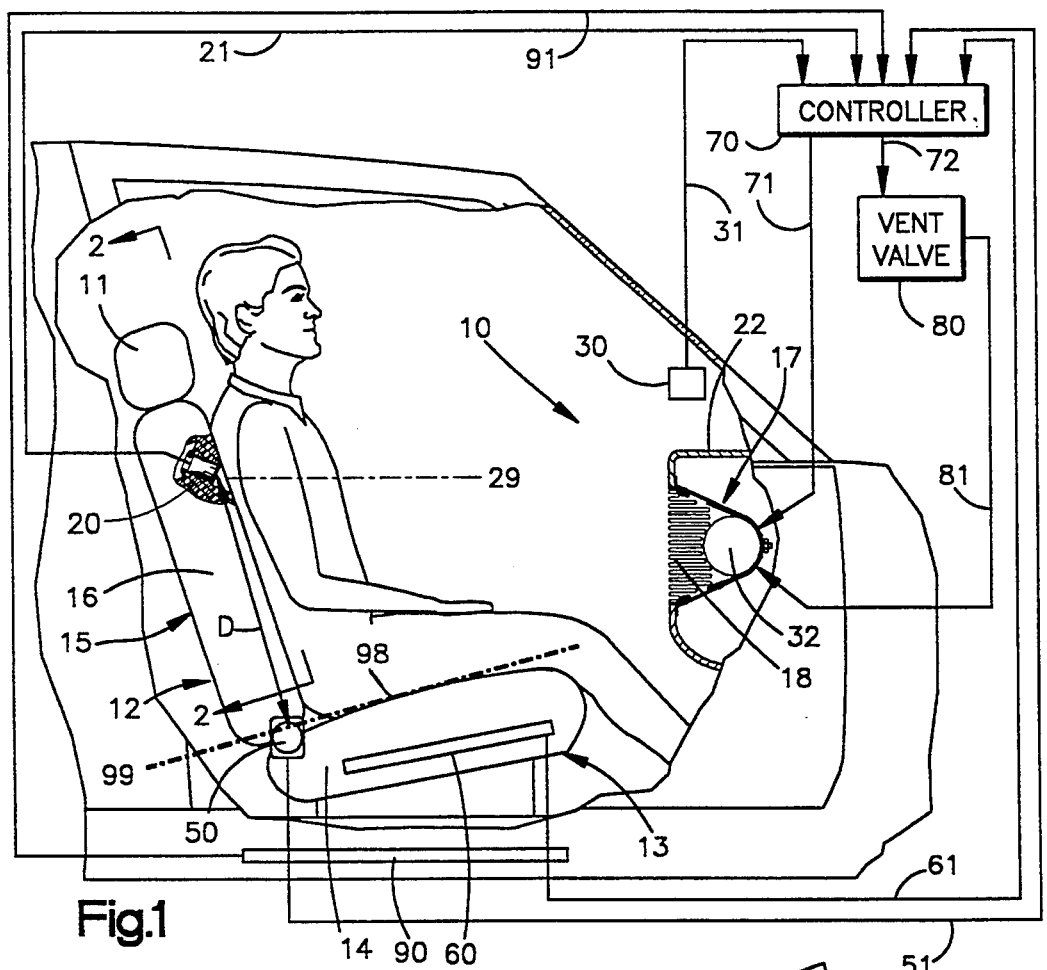
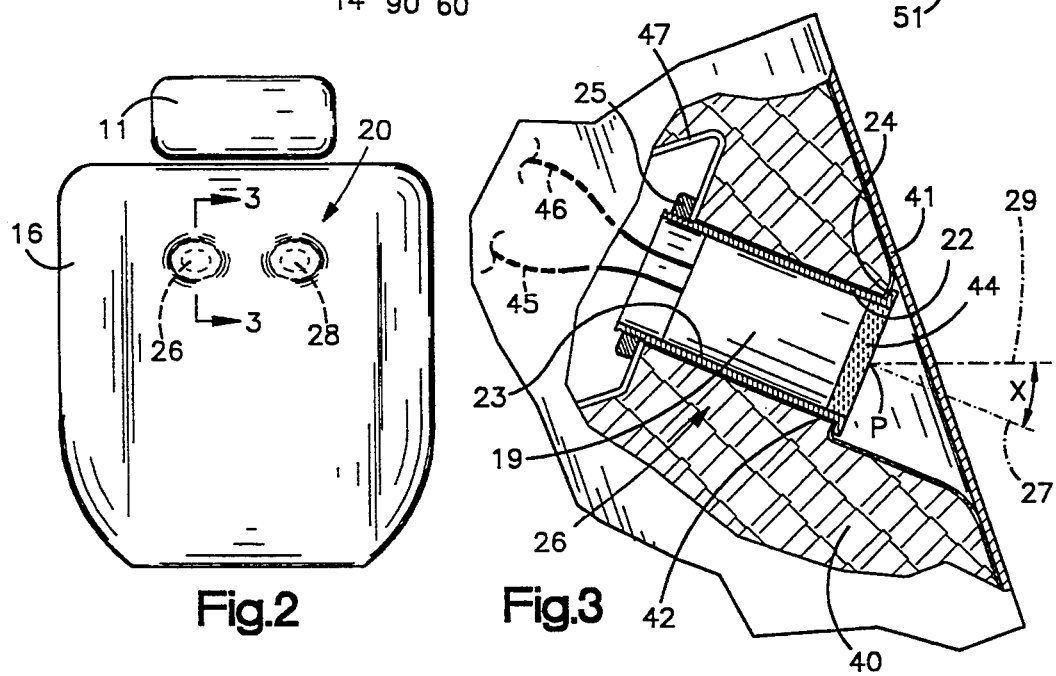

VEHICLE OCCUPANT RESTRAINT SYSTEM INCLUDING OCCUPANT POSITION SENSOR MOUNTED IN SEAT BACK

This is a continuation of application Ser. No. 08/161,141 filed on Dec. 2, 1993, abandoned.

TECHNICAL FIELD

The present invention relates to a vehicle occupant restraint system, and is particularly directed to a vehicle occupant position sensor for use in a vehicle occupant restraint system.

BACKGROUND OF THE INVENTION

A vehicle occupant restraint system may include a sensor for providing a position signal indicative of the position of a vehicle occupant in a vehicle seat. The position signal is then processed to provide a control signal to control an actuatable safety device depending upon the position of the vehicle occupant in the vehicle seat. For example, an occupant position sensor may be used in an inflatable restraint system to control inflation of an air bag depending upon the position of a vehicle occupant in a vehicle seat.

Typically, an occupant position sensor is mounted in front of the vehicle occupant, such as on the vehicle instrument panel, or to the side of the occupant. Mounting an occupant position sensor in front of a vehicle occupant or to the side of the occupant may provide a false reading because of an object placed between the position sensor and the occupant. For example, the object may be the hand of the vehicle occupant, the crossed legs of the occupant, or a map or the like held between the position sensor and the occupant.

U.S. Pat. No. 5,118,134 suggests mounting a position sensor in the head rest of a vehicle seat. However, a position sensor mounted in the head rest may not be able to sense the position of a relatively short occupant seated in the vehicle seat.

SUMMARY OF THE INVENTION

In accordance with the present invention, a vehicle occupant restraint system is associated with a vehicle seat having a seat back and an occupant position sensor means mounted in the seat back of the seat, beneath any head rest which may be associated with the seat. The occupant position sensor means senses the position of an occupant in the vehicle seat and provides a position signal indicative of the position of the occupant in the seat. A deceleration sensor provides a signal indicative of sudden vehicle deceleration above a predetermined threshold such as occurs in a vehicle collision. An occupant restraint means is actuatable in response to the deceleration sensor providing the signal indicative of sudden vehicle deceleration above the predetermined threshold. When actuated, the occupant restraint means restrains the occupant in the vehicle seat. The occupant restraint means includes means for controlling the occupant restraint means as a function of the position signal from the occupant position sensor means.

Preferably, the occupant position sensor means includes an ultrasonic sensor having a sound beam which is directed along a central axis towards the occupant in a downward direction relative to a horizontal line. The angle formed between the central axis of the sound beam and the horizontal line is no greater than 80°. Preferably, the angle formed between the central axis of the sound beam and the horizontal line is about 12°.

The seat back of the vehicle seat includes foam material in which the occupant position sensor is preferably located and to which the occupant position sensor means may be secured. The seat back of the vehicle seat also includes fabric material which may cover the occupant position sensor means mounted in the foam material. The fabric material and the foam material of the seat back cooperate to protect the occupant position sensor means and hide the occupant position sensor means from view.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a vehicle occupant restraint system embodying an occupant position sensor in accordance with the present invention;

FIG. 2 is a view taken approximately along line 2—2 of FIG. 1;

FIG. 3 is sectional view, taken approximately along line 3—3 of FIG. 2;

DESCRIPTION OF PREFERRED EMBODIMENTS

Figure 4:
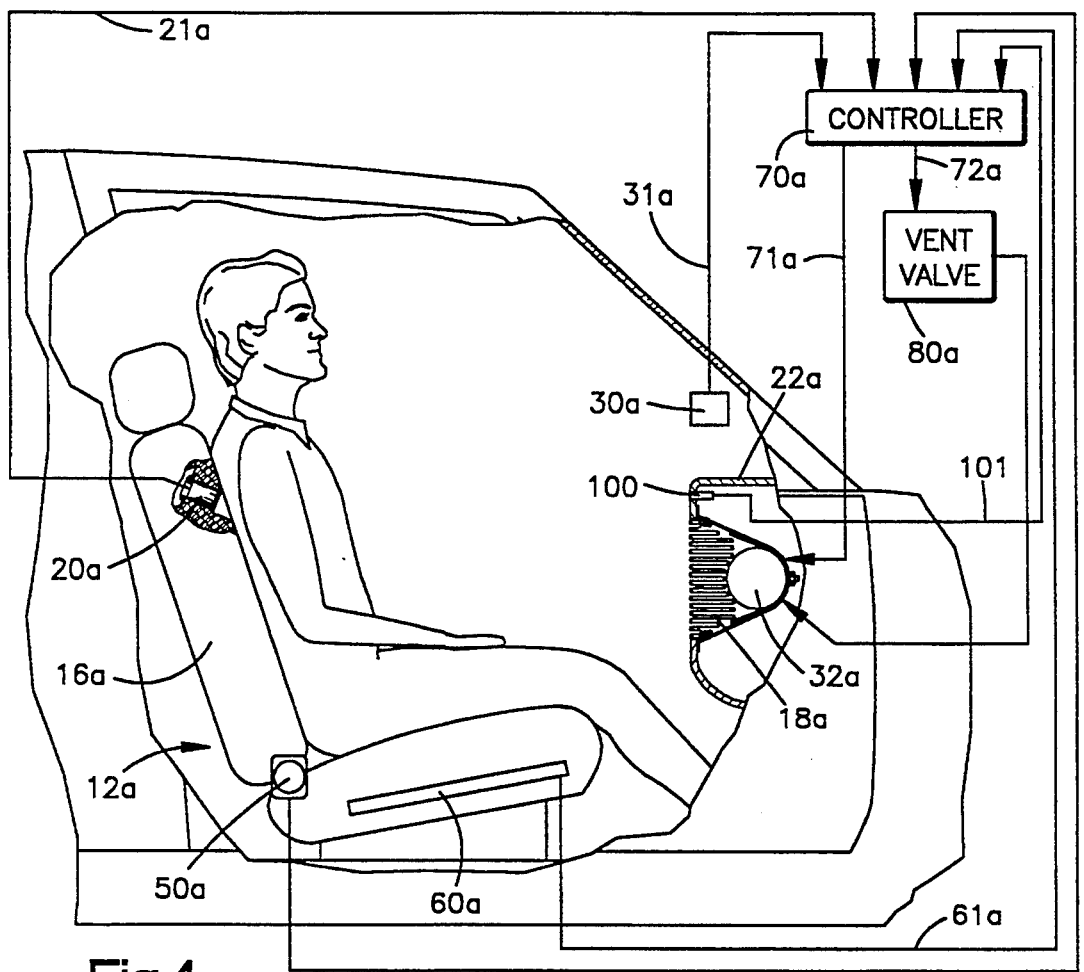
FIG. 4 is a view, similar to FIG. 1, showing a second embodiment of the present invention.

The present invention is directed to a vehicle occupant restraint system having an occupant position sensor. The specific type and construction of occupant restraint system and the specific type and construction of occupant position sensor may vary. As representative of the present invention, a vehicle occupant restraint system 10 embodying an occupant position sensor 20 is illustrated in FIG. 1.

Referring to FIG. 1, the vehicle occupant restraint system 10 protects a vehicle occupant seated in a vehicle seat 12 in the event of a vehicle collision. The vehicle seat 12 comprises a head rest 11, a structure 13 including a seat bottom cushion 14, and a structure 15 including a seat back cushion 16 located between the seat bottom cushion 14 and the head rest 11.

The vehicle occupant restraint system 10 includes an air bag module 17 mounted in a vehicle instrument panel 22. The air bag module 17 includes a folded inflatable air bag 18 stored in the air bag module 17. The air bag 18 is inflatable from a stored condition (shown in solid lines in FIG. 1) to an inflated condition (not shown).

A deceleration sensor 30 is mounted at a suitable location on the vehicle. The deceleration sensor 30 may be any type of vehicle deceleration sensor. When deceleration of at least a predetermined magnitude of the vehicle occurs, the deceleration sensor 30 provides a signal on line 31 indicative of the deceleration.

The air bag module 17 includes an actuatable inflator 32 which actuates in response to a deceleration signal on line 31 from the deceleration sensor 30. The inflator 32 contains a source of inflation fluid, such as a pyrotechnic gas generating material or a quantity of stored gas or a combination of stored gas and gas generating material. When actuated, the inflator 32 directs gas into the interior of the folded air bag 18 to inflate the air bag 18. When the air bag 18 expands to its inflated condition, it restrains movement of an occupant seated in the seat 12 and reduces the probability of the occupant violently striking parts of the vehicle such as the vehicle instrument panel 22.

A seat inclination sensor 50 is located in a seat latch assembly (not shown) between the seat back cushion 16 and the seat bottom cushion 14. The seat inclination sensor 50 provides a signal on line 51 which is indicative of the extent of inclination of the seat back cushion 16 relative to the seat bottom cushion 14. An occupant weight sensor 60 is located in or on the structure 13 that includes seat bottom cushion 14 and provides a signal on line 61 which is indicative of the weight of an occupant in the seat 12. The seat bottom cushion 14 has a generally flat central surface portion 98 on which the occupant sits. The generally flat central surface portion 98 lies in a plane 99, as shown in FIG. 1.

A seat position sensor 90 is located beneath the seat bottom cushion 14. The seat position sensor 90 is operatively connected to the structure 13 that includes the seat bottom cushion 14. The seat position sensor 90 provides a signal on line 91 which is indicative of the position of the structure 13 in the forward and rearward directions of travel of the vehicle. The seat position sensor 90 may be, for example, a potentiometer.

The occupant position sensor 20 is mounted in the seat back cushion 16. The occupant position sensor 20 may be of any suitable type, such as an infrared sensor or an ultrasonic sensor. For example, the occupant position sensor 20 may be a piezoelectric ultrasonic sensor which includes a ceramic crystal capable of transmitting an output signal in the form of a beam. The output signal is, preferably, a pulsed signal and has a frequency in the range between about 30 kilohertz and about 200 kilohertz.

Referring to FIGS. 2 and 3, the occupant position sensor 20 includes a transmitter 26 and a receiver 28. The transmitter 26 comprises a generally cylindrical-shaped case 22 having a flange 24 at one end and extending radially outward from the case 22. The case 22 defines a chamber 23 in which the ceramic crystal and processing circuitry, shown schematically at 19, are disposed. A pair of power lines 45, 46 supply power to operate the processing circuitry contained in the chamber 23. A cover 44 is located at the end of the chamber 23 adjacent the flange 24 to help hold the ceramic crystal and the processing circuitry in the chamber 23. The receiver 28 comprises a case (not shown) which has the same construction as the case 22 of the transmitter 26. The case of the receiver 28 defines a chamber (also not shown) in which processing circuitry is disposed.

The structure 15 that includes seat back cushion 16 comprises a foam material 40 which defines in part a hollow space 42 in which the transmitter 26 is mounted. The transmitter 26 is mounted to the foam material 40. Specifically, as shown in FIG. 3, a piece of sheet metal 47 encircles and extends radially away from the case 22 at its end opposite the flange 24. The outer periphery of the case 22 adjacent the sheet material piece 47 has threads. A nut 25 is threaded onto the case 22 and engages the sheet metal piece 47. When the nut 25 is tightened against the sheet metal piece 47, the foam material 40 is clamped between the sheet metal piece 47 and the flange 24. The case 22 of the occupant position sensor 20 is thus secured to the foam material 40 by the nut 25, the sheet metal piece 47, and the flange 24. The sheet metal piece 47 also holds a portion of the foam material 40 away from the case 22.

A fabric material 41, which covers the seat back cushion 16, overlies the foam material 40 and also covers the transmitter 26. The fabric material 41 and the foam material 40 cooperate to protect the transmitter 26 and hide the transmitter 26 from view. The transmitter 26 is located behind the fabric material 41 and about sixteen inches above the plane 99 of the seat bottom cushion 14 and below the head rest 11. More specifically, a point designated with the letter "P" at the center of the cover 44 of the sensor 20 (shown in FIG. 3) is located about sixteen inches above the plane 99 (shown in FIG. 1). This distance of sixteen inches is designated with the letter "D" in FIG. 1. The receiver 28 is mounted on the structure 15 in the same manner as the transmitter 26.

The transmitter 26 and the receiver 28 are both mounted in the seat back cushion 16, as illustrated in FIG. 3. It is conceivable that either the transmitter 26 and/or the receiver 28 may not be covered by the fabric material 41, in which case they would show as decorative pieces. Although the transmitter 26 and the receiver 28 are shown as separate units in FIG. 2, it is contemplated that the transmitter 26 and the receiver 28 may be constructed as a single unit.

The transmitter 26 of the occupant position sensor 20 transmits a sound pulse towards the back of the occupant, and the receiver 28 receives a reflected echo of the sound pulse from the back of the occupant. The processing circuitry of the occupant position sensor 20 measures the time between the transmission of a sound pulse and the reception of a reflected echo of the sound pulse by the receiver 28 and provides a signal indicative of the elapsed time. This measured signal is functionally the distance between the structure 15 that includes the seat back cushion 16 and the back of the occupant and is, therefore, functionally related to the position of the occupant seated in the seat 12. The processing circuitry of the occupant position sensor 20 provides a signal on line 21 (FIG. 1) indicative of the position of the occupant in the seat 12. The transmitter 26 directs its sound pulses in the shape of a beam along an axis 27 (FIG. 3) towards the back of the occupant. The axis 27 is oriented in a downward direction relative to a horizontal line 29 which extends in the forward and rearward directions of travel of the vehicle.

The seat 12 is shown in FIG. 1 in its nominal design riding position with the structure 15 that includes the seat back cushion 16 at a nominal seat back incline angle. As is known among vehicle manufacturers, the nominal seat back incline angle is predetermined for a particular vehicle. The nominal seat back incline angle does not correspond to the seat back cushion 16 being in either the fully up position or the fully down position.

When the structure 15 that includes the seat back cushion 16 is at its nominal seat back incline angle, the angle formed between the axis 27 of the beam and the horizontal line 29, which is designated with the letter "X" in FIG. 3, is no greater than 80°. Preferably, the angle X formed between the beam axis 27 and the horizontal line 29 is about 12° when the structure 15 that includes the seat back cushion 16 is at its nominal seat back incline angle. If the axis 27 of the beam is not directed downward at a sufficiently large angle relative to the horizontal line 29, the beam may be reflected off the back of the occupant in a manner such that an adequate signal is not received by the receiver 28. If this occurs, the occupant position sensor 20 may not provide a position signal indicative of the actual position of the occupant in the seat 12.

The location of the sensor 20 in the seat back structure 15 is also important. If the occupant position sensor 20 is mounted too low in the seat back structure 15, the occupant position sensor 20 may not sense enough displacement of the occupant to provide a position signal indicative of the actual position of the upper torso of the occupant in the seat 12. If the sensor 20 is mounted too high, the sensor 20 may not detect the position of a relatively short occupant in the seat 12.

The ability of the sensor 20 to detect the position of a short occupant is ensured by mounting point P on the cover 44 of the sensor 20 about sixteen inches above the plane 99 of the seat bottom cushion 14 and below the head rest 11. This distance of sixteen inches corresponds to the shoulder pivot height of a seated 50th percentile five year old child, the smallest occupant desired to be sensed. Orienting the axis 27 of the beam downward at an angle of about 12° below the horizontal line 29 also helps ensure that the position of a relatively short occupant in the seat 12 can be sensed by the occupant position sensor 20. Also, mounting the sensor 20 in the seat back cushion 16 minimizes the chance of the sensor 20 providing a false reading because of an object placed between the occupant position sensor 20 and the occupant.

A controller 70 monitors the signals on lines 21, 31, 51, 61, 91 from the sensors 20, 30, 50, 60, 90, respectively. The controller 70 has a number of predetermined stored values including the nominal seat back incline angle. The controller 70 provides a first control signal on line 71 when the controller 70 receives the signal on line 31 indicative of the occurrence of vehicle deceleration indicative of a collision requiring restraint of the occupant. The controller 70 also provides a second control signal on line 72 which depends upon the signals on lines 21, 51, 61, 91 from the sensors 20, 50, 60, 90, respectively. The second control signal on line 72 is applied to a vent valve assembly 80, for example, to control operation of the vent valve assembly 80. The vent valve assembly 80 is part of the air bag module 17, but is shown schematically by line 81 in FIG. 1 to the air bag module 17.

More specifically, when the deceleration sensor 30 provides a signal on line 31 indicative of the occurrence of deceleration indicative of a collision requiring deployment of the air bag 18 to restrain the occupant, the controller 70 provides the first control signal on line 71 to actuate the inflator 32. When the inflator 32 of the air bag module 17 is actuated, the vent valve assembly 80 controls the extent to which inflation fluid from the inflator 32 is vented, rather than being directed into the air bag 18. Thus, a portion of the inflation fluid which is provided by the inflator 32 is directed away from the air bag 18 by the vent valve assembly 80. The amount of inflation fluid that is directed away from the air bag 18 by the vent valve assembly 80 is determined by the extent to which the vent valve assembly 80 is opened in response to the second control signal on line 72 from the controller 70.

The controller 70 subtracts the signal on line 21 from the signal on line 91 to provide a difference signal which is functionally related to the position of the occupant relative to the instrument panel 22. The controller 70 processes this difference signal further to generate the second control signal on line 72. Thus, the second control signal on line 72 varies as a function of at least the position of the occupant relative to the instrument panel 22.

It should be apparent that each of the signals on lines 21, 51, 61, 91, from the sensors 20, 50, 60, 90 is indicative of a different variable associated with the occupant in the seat 12. Since the second control signal on line 72 depends upon each of the signals on lines 21, 51, 61, 91, the amount of inflation fluid directed into the air bag 18 is controlled in accordance with different variables associated with the occupant in the seat 12, including the position of the occupant relative to the instrument panel 22 as determined by subtracting the signal on line 21 from the signal on line 91, as described hereinabove. Thus, the inflated air bag 18 has an internal fluid pressure and can provide a restraining force which is based on different variables associated with the occupant in the seat 12, including the position of the occupant relative to the instrument panel 22.

A second embodiment of the present invention is illustrated in FIG. 4. Since the embodiment of the invention illustrated in FIG. 4 is generally similar to the embodiment of the invention illustrated in FIGS. 1-3, similar numerals are utilized to designate similar components, the suffix letter "a" being associated with the numerals of the embodiment of FIG. 4 to avoid confusion.

As shown in FIG. 4, a second occupant position sensor 100 is mounted in front of an occupant in the seat 12a. Specifically, the occupant position sensor 100 is mounted in the vehicle instrument panel 22a. The structure and operation of the occupant position sensor 100 are the same as the structure and operation of the occupant position sensor 20a mounted in the seat back 16a of the vehicle seat 12a.

The occupant position sensor 100 provides a signal on line 101 indicative of the position of the occupant in the seat 12a. The position signals on lines 21a and 101 may be processed in a number of different ways to obtain an occupant position signal which varies as a function of the position signals on lines 21a and 101. For example, the signals on lines 21a and 101 could be algebraically computed in a number of different ways to provide the occupant position signal. Also, the signals on lines 21a and 101 may be processed to provide information other than just the position of the occupant in the seat 12a. The signals on lines 21a and 101 may, for example, be processed to provide information about a direction of movement of the occupant (i.e., in the forward or rearward directions of travel of the vehicle) and/or the speed of movement of the occupant in that direction.

The controller 70a provides the first control signal on line 71a to actuate the inflator 32a and thereby to inflate the air bag 18a when the controller 70a receives the signal on line 31a from the deceleration sensor 30a indicative of the occurrence of vehicle deceleration indicative of a collision. The controller 70a also monitors the signals on lines 101, 21a, 51a, 61a from the sensors 100, 20a, 50a, 60a, respectively, and provides the second control signal on line 72a. The second control signal on line 72a is applied to the vent valve assembly 80a to control operation of the vent valve assembly 80a in the same way as the second control signal on line 72 is applied to the vent valve assembly 80 to control operation of the vent valve assembly 80 in the embodiment of FIGS. 1-3. As a result, the air bag 18a in the embodiment of FIG. 4 provides a restraining force which is closely related with different variables associated with the occupant in the seat 12a, including the position of the occupant in the seat 12a.

Figure 5:
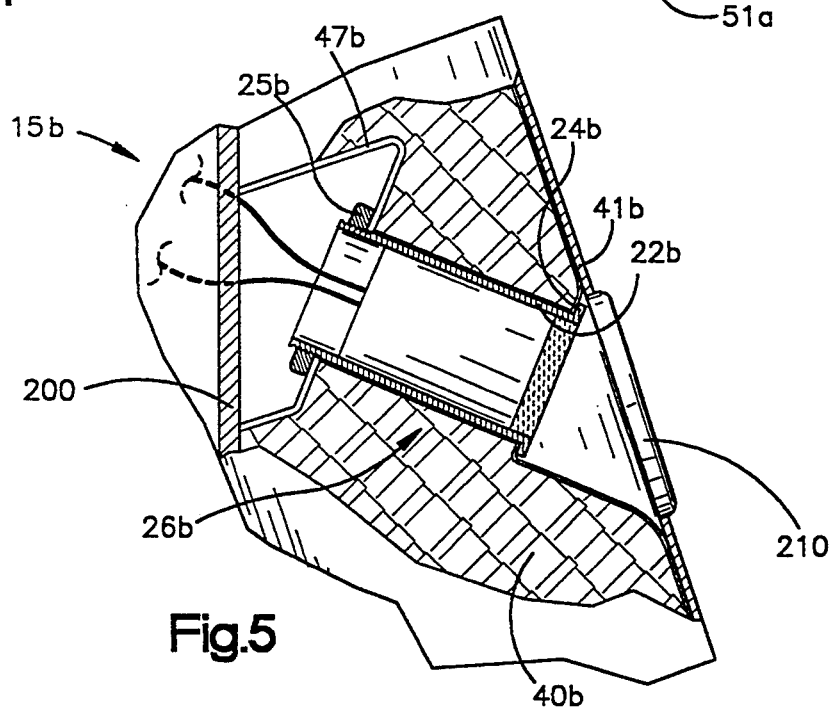
FIG. 5 is a view, similar to FIG. 3, showing a third embodiment of the present invention.

A third embodiment of the present invention is illustrated in FIG. 5. Since the embodiment of the invention illustrated in FIG. 5 is generally similar to the embodiment of the invention illustrated in FIGS. 1–3, similar numerals are utilized to designate similar components, the suffix letter "b" being associated with the numerals of FIG. 5 to avoid confusion.

As shown in FIG. 5, the piece of sheet metal 47b is connected to a seat frame part 200 of the structure 15b. The case 22b in the embodiment of FIG. 5 is secured to the foam material 40b by the nut 25b, the sheet metal piece 47b, and the flange 24b in the same way as the case 22 in the embodiment of FIGS. 1–3 is secured. A decorative style button 210 extends through a portion of the fabric material 41b and covers the transmitter 26b, as shown in FIG. 5. The decorative style button 210 protects the transmitter 26b and hides the transmitter 26b from view. Another decorative style button (not shown) may also extend through another portion of the fabric material 41b and cover the receiver (not shown in FIG. 5) in the same manner as the transmitter 26b is covered.

From the above description of the invention, those skilled in the art to which the present invention relates will perceive improvements, changes and modifications. For example, it is contemplated that controllable safety devices other than an air bag may be controlled by the system disclosed above. Such devices include seat belt retractor or D-ring pretensioners, adjustable web clamps, variably controlled knee blockers, and controllable seats. Controllable seats include those that controllably move to prevent submarining of the vehicle occupant. In addition to the control of venting of an air bag as described above, it is contemplated that air bag ignition timing can be controlled, that multi-rate air bag inflators can be controlled, that the throttling of the diffuser can be controlled, and that the air bag can be aimed under the control of the disclosed system. It is intended to include all such modifications and changes insofar as they come within the scope of the appended claims and the equivalents thereof.

Having described the invention, the following is claimed:

1. A vehicle occupant restraint system comprising:
deceleration sensor means for providing a deceleration signal indicative of sudden vehicle deceleration such as occurs in a vehicle collision requiring actuation of an actuatable occupant restraint;
a vehicle seat including a seat back and a seat bottom;
occupant position sensor means mounted in said seat back of said vehicle seat for (i) sensing the position of an occupant in said vehicle seat and (ii) providing a position signal indicative of the position of the occupant in said vehicle seat, said seat back of said vehicle seat including foam material to which said occupant position sensor means is secured, said seat back of said vehicle seat including a decorative style button which covers said occupant sensor means; and
actuatable occupant restraint means for, when actuated in response to said deceleration sensor means providing said deceleration signal, restraining the occupant in said vehicle seat, said occupant restraint means including controller means for controlling said occupant restraint means as a function of said position signal from said occupant position sensor means.

2. A vehicle occupant restraint system comprising:
deceleration sensor means for providing a deceleration signal indicative of sudden vehicle deceleration such as occurs in a vehicle collision requiring actuation of an actuatable occupant restraint;
a vehicle seat including a seat back and a seat bottom;
occupant position sensor means mounted in said seat back of said vehicle seat for (i) sensing the position of an occupant in said vehicle seat and (ii) providing a position signal indicative of the position of the occupant in said vehicle seat, said back seat of said vehicle seat including a seat frame part and a bracket mounted to said seat frame part, said occupant position sensor means being secured to said bracket, said seat back of said vehicle seat including a decorative style button which covers said occupant sensor means; and
actuatable occupant restraint means for, when actuated in response to said deceleration sensor means providing said deceleration signal, restraining the occupant in said vehicle seat, said occupant restraint means including controller means for controlling said occupant restraint means as a function of said position signal from said occupant position sensor means.

3. A vehicle occupant restraint system for use in a vehicle including a vehicle seat having a seat back and a seat bottom, said vehicle occupant restraint system comprising:
deceleration sensor means for providing a deceleration signal indicative of sudden vehicle deceleration such as occurs in a vehicle collision requiring actuation of an actuatable occupant restraint;
occupant position sensor means mounted in said seat back of said vehicle seat for (i) sensing the position of an occupant in said vehicle seat and (ii) providing a position signal indicative of the position of the occupant in said vehicle seat, said seat back of said vehicle seat including foam material to which said occupant position sensor means is mounted, said seat back of said vehicle seat including a decorative style button which covers said occupant sensor means; and
actuatable occupant restraint means for, when actuated in response to said deceleration sensor means providing said deceleration signal, restraining the occupant in said vehicle seat, said occupant restraint means including means for varying the operation of said occupant restraint means as a function of said position signal from said occupant position sensor means.

4. A vehicle occupant restraint system for use in a vehicle including a vehicle seat having a seat back and a seat bottom, said vehicle occupant restraint system comprising:
deceleration sensor means for providing a deceleration signal indicative of sudden vehicle deceleration such as occurs in a vehicle collision requiring actuation of an actuatable occupant restraint;
occupant position sensor means mounted in said seat back of said vehicle seat for (i) sensing the position of an occupant in said vehicle seat and (ii) providing a position signal indicative of the position of the occupant in said vehicle seat, said seat back of said vehicle seat including a seat frame part and a bracket mounted to said seat frame part, said occupant position sensor means being secured to said bracket, said seat back of said vehicle seat including a decorative style button which covers said occupant sensor means; and actuatable occupant restraint means for, when actuated in response to said deceleration sensor means providing said deceleration signal, restraining the occupant in said vehicle seat, said occupant restraint means including means for varying the operation of said occupant restraint means as a function of said position signal from said occupant position sensor means.

5. A vehicle occupant restraint system comprising:

deceleration sensor means for providing a deceleration signal indicative of sudden vehicle deceleration such as occurs in a vehicle collision requiring actuation of an actuatable occupant restraint;

a vehicle seat including a seat back and a seat bottom;

occupant position sensor means mounted in said seat back of said vehicle seat for (i) sensing the position of an occupant in said vehicle seat and (ii) providing a position signal indicative of the position of the occupant in said vehicle seat, said seat back of said vehicle seat including a decorative style button which covers said occupant sensor means; and actuatable occupant restraint means for, when actuated in response to said deceleration sensor means providing said deceleration signal, restraining the occupant in said vehicle seat, said occupant restraint means including controller means for controlling said occupant restraint means as a function of said position signal from said occupant position sensor means.

6. A vehicle occupant restraint system for use in a vehicle including a vehicle seat having a seat back and a seat bottom, said vehicle occupant restraint system comprising:

deceleration sensor means for providing a deceleration signal indicative of sudden vehicle deceleration such as occurs in a vehicle collision requiring actuation of an actuatable occupant restraint;

occupant position sensor means mounted in said seat back of said vehicle seat for (i) sensing the position of an occupant in said vehicle seat and (ii) providing a position signal indicative of the position of the occupant in said vehicle seat, said seat back of said vehicle seat including a decorative style button which covers said occupant sensor means; and actuatable occupant restraint means for, when actuated in response to said deceleration sensor means providing said deceleration signal, restraining the occupant in said vehicle seat, said occupant restraint means including means for varying the operation of said occupant restraint means as a function of said position signal from said occupant position sensor means.

7. A vehicle occupant restraint system comprising:

deceleration sensor means for providing a deceleration signal indicative of sudden vehicle deceleration such as occurs in a vehicle collision requiring deployment of an occupant restraint;

a vehicle seat including a seat bottom, a seat back, and a head rest above said seat back;

occupant position sensor means mounted in said seat back and below said head rest of said vehicle seat for (i) sensing the position of an occupant in said vehicle seat and (ii) providing a continuous analog occupant position signal indicative of the position of the occupant relative to said seat back of said vehicle seat;

seat position sensor means for providing a continuous analog seat position signal indicative of the position of said vehicle seat in the forward and rearward directions of travel of the vehicle;

occupant restraint means including an inflatable air bag for, when inflated in response to said deceleration sensor means providing said deceleration signal, restraining the occupant in said vehicle seat; and controller means for controlling inflation of said air bag as a function of the difference between said continuous analog occupant position signal from said occupant position sensor means and said continuous analog seat position signal from said seat position sensor means.

8. A vehicle occupant restraint system according to claim 7 further comprising a vent valve which, when opened, vents inflation fluid away from said air bag, the amount of inflation fluid being vented through said vent valve varying as a function of said difference signal between said continuous analog occupant position signal from said occupant position sensor means and said continuous analog seat position signal from said seat position sensor means.

9. A vehicle occupant restraint system according to claim 7 wherein said occupant position sensor means transmits a signal toward the occupant along a central axis, said central axis extending along a first line which is oriented in a downward direction relative to a second line which extends horizontally in the forward and rearward directions of travel of the vehicle, the angle formed between said first and second lines being no greater than 80°.

10. A vehicle occupant restraint system according to claim 7 wherein said occupant position sensor means is located about sixteen inches above a plane of said seat bottom of said vehicle seat and below said head rest of said vehicle seat.

11. A vehicle occupant restraint system according to claim 7 wherein said seat back of said vehicle seat includes a seat frame part and a bracket connected to said seat frame part, and foam material, and further comprising means for securing said occupant position sensor means to said bracket and said foam material and causing said bracket to press against said foam material.

12. A vehicle occupant restraint system comprising:

deceleration sensor means for providing a deceleration signal indicative of sudden vehicle deceleration such as occurs in a vehicle collision requiring deployment of an occupant restraint;

a vehicle seat including a seat bottom, a seat back, and a head rest above said seat back;

occupant position sensor means mounted in said seat back and below said head rest of said vehicle seat for (i) sensing the position of an occupant in said vehicle seat and (ii) providing a continuous analog occupant position signal indicative of the position of the occupant relative to said seat back of said vehicle seat;

said occupant position sensor means transmitting a signal toward the occupant along a central axis, said central axis extending along a first line which is oriented in a downward direction relative to a second line which extends horizontally in the forward and rearward directions of travel of the vehicle, the angle formed between said first and second lines being no greater than 80°, said occupant position sensor means being located about sixteen inches above a plane of said seat bottom of said vehicle seat and below said head rest of said vehicle seat;

actuatable occupant restraint means for, when actuated in response to said deceleration sensor means providing said deceleration signal, restraining the occupant in said vehicle seat; and controller means for controlling said occupant restraint means as a function of said continuous analog occupant position signal from said occupant position sensor means.

13. A vehicle occupant restraint system according to claim 12 wherein the angle formed between said first and second lines is about 12°.

14. A vehicle occupant restraint system according to claim 12 further comprising seat position sensor means for providing a continuous analog position signal indicative of the position of said vehicle seat in the forward and rearward directions of travel of the vehicle, said controller means controlling said occupant restraint means as a function of the difference between said continuous analog occupant position signal from said occupant position sensor means and said continuous analog seat position signal from said seat position sensor means.

15. A vehicle occupant restraint system according to claim 12 wherein said seat back of said vehicle seat includes a seat frame part and a bracket connected to said seat frame part, and foam material, and further comprising means for securing said occupant position sensor means to said bracket and said foam material and causing said bracket to press against said foam material.

16. A vehicle occupant restraint system comprising:
deceleration sensor means for providing a deceleration signal indicative of sudden vehicle deceleration such as occurs in a vehicle collision requiring deployment of an occupant restraint;

a vehicle seat including a seat bottom, a seat back, and a head rest above said seat back;

occupant position sensor means mounted in said seat back and below said head rest of said vehicle seat for (i) sensing the position of an occupant in said vehicle seat and (ii) providing a continuous analog occupant position signal indicative of the position of the occupant relative to said seat back of said vehicle seat;

said seat back of said vehicle seat including a seat frame part and a bracket connected to said seat frame part, and foam material;

means for securing said occupant position sensor means to said bracket and said foam material and causing said bracket to press against said foam material, said seat back of said vehicle seat including fabric material which covers said occupant position sensor means, said fabric material and said foam material of said seat back cooperating to protect said occupant position sensor means and hide said occupant position sensor means from view;

actuatable occupant restraint means for, when actuated in response to said deceleration sensor means providing said deceleration signal, restraining the occupant in said vehicle seat; and controller means for controlling said occupant restraint means as a function of said continuous analog occupant position signal from said occupant position sensor means.

17. A vehicle occupant restraint system according to claim 16 wherein said occupant position sensor means transmits a signal toward the occupant along a central axis, said central axis extending along a first line which is oriented in a downward direction relative to a second line which extends horizontally in the forward and rearward directions of travel of the vehicle, the angle formed between said first and second lines being no greater than 80°.

18. A vehicle occupant restraint system according to claim 16 wherein said occupant position sensor means is located about sixteen inches above a plane of said seat bottom of said vehicle seat and below said head rest of said vehicle seat.

19. A vehicle occupant restraint system according to claim 16 further comprising seat position sensor means for providing a continuous analog position signal indicative of the position of said vehicle seat in the forward and rearward directions of travel of the vehicle, said controller means controlling said occupant restraint means as a function of the difference between said continuous analog occupant position signal from said occupant position sensor means and said continuous analog seat position signal from said seat position sensor means.

* * * * *